(12) United States Patent
Littlefield et al.

(10) Patent No.: US 8,813,896 B2
(45) Date of Patent: Aug. 26, 2014

(54) VEHICLE

(71) Applicant: GM Global Technology Operations LLC, Detroit, MI (US)

(72) Inventors: Joseph Ralph Littlefield, Waterford, MI (US); Anthony P. Tata, Fenton, MI (US); Michael O. Harpster, Jr., Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 13/745,016

(22) Filed: Jan. 18, 2013

(65) Prior Publication Data

US 2014/0202280 A1 Jul. 24, 2014

(51) Int. Cl.
*B60K 6/40* (2007.10)
*B60K 6/405* (2007.10)

(52) U.S. Cl.
USPC ........ 180/274; 180/65.21; 180/294; 180/291; 180/344; 180/346; 180/377; 903/951; 903/952

(58) Field of Classification Search
CPC .................................. B60K 6/40; B60K 6/405
USPC ............ 180/65.21, 65.1, 274, 232, 291, 292, 180/294, 298, 344, 346, 377; 74/606 R; 903/951, 952
See application file for complete search history.

(56) References Cited

U.S. PATENT DOCUMENTS

| | | | | |
|---|---|---|---|---|
| 5,476,151 | A * | 12/1995 | Tsuchida et al. | 180/274 |
| 6,166,498 | A * | 12/2000 | Yamaguchi et al. | 318/34 |
| 6,201,365 | B1 * | 3/2001 | Hara et al. | 318/558 |
| 7,510,036 | B2 * | 3/2009 | Kikuchi et al. | 180/65.1 |
| 7,802,643 | B2 * | 9/2010 | Yajima | 180/65.22 |
| 8,479,867 | B2 * | 7/2013 | Fukazu et al. | 180/291 |
| 2011/0162902 | A1 * | 7/2011 | Dobbins et al. | 180/68.5 |
| 2011/0315461 | A1 * | 12/2011 | Suzuki | 180/65.22 |

* cited by examiner

*Primary Examiner* — Ruth Ilan
(74) *Attorney, Agent, or Firm* — Quinn Law Group, PLLC

(57) ABSTRACT

A vehicle including a vehicle body is disclosed. A transmission casing includes a plurality of walls extending outwardly to a distal edge. One of the walls defines a first side and another one of the walls defines a second side. A power inverter module is coupled to the transmission casing to define a unit disposed in a first position when the unit is stationary relative to a first end of the vehicle body and a second position when the unit moves toward a second end of the vehicle body. The power inverter module slopes downwardly from the first side toward the second side to define a module angle relative to a longitudinal axis such that the power inverter module defines an angular position. The angular position of the power inverter module minimizes engagement of the power inverter module with a component when the unit is in the second position.

20 Claims, 13 Drawing Sheets

VEHICLE

TECHNICAL FIELD

The present disclosure relates to a vehicle.

BACKGROUND

Various transmissions have been developed for vehicles. One type of transmission is an electrically-variable transmission including two electric motor/generators, clutches, etc. Clutches allow one or more electrically-variable modes of operation, fixed speed ratio modes, and an electric-only (battery-powered) mode. An electric power inverter assembly is utilized to control the first and second electric motor/generators. Generally, the electric power inverter assembly is assembled remote from the electrically-variable transmission; therefore, assembly of the electric power inverter is labor intensive and additional brackets or supports are generally utilized to secure the electric power inverter assembly remote from the transmission.

SUMMARY

The present disclosure provides a vehicle including a vehicle body. The vehicle body includes a first end and a second end spaced from each other along a longitudinal axis. The vehicle also includes a component disposed between the first and second ends of the vehicle body. The vehicle further includes a transmission casing disposed between the first and second ends of the vehicle body. The transmission casing includes a base and a plurality of walls extending outwardly away from the base to a distal edge opposing the base. One of the walls defines a first side facing the first end of the vehicle body and another one of the walls defines a second side facing the second end of the vehicle body. The vehicle also includes a power inverter module disposed between the walls adjacent to the distal edge of each of the walls. The power inverter module is coupled to the transmission casing to define a unit. The unit is disposed in a first position when the unit is stationary relative to the first end of the vehicle body and the unit is disposed in a second position when the unit moves toward the second end of the vehicle body. The power inverter module slopes downwardly from the first side toward the second side to define a module angle relative to the longitudinal axis such that the power inverter module defines an angular position. The angular position of the power inverter module minimizes engagement of the power inverter module with the component when the unit is in the second position.

The present disclosure also provides a vehicle including a vehicle body. The vehicle body includes a first end and a second end spaced from each other along a longitudinal axis. The vehicle also includes a brake system disposed between the first and second ends of the vehicle body. The vehicle further includes a transmission casing disposed between the first and second ends of the vehicle body. The transmission casing includes a base and a plurality of walls extending outwardly away from the base to a distal edge opposing the base. One of the walls defines a first side facing the first end of the vehicle body and another one of the walls defines a second side facing the second end of the vehicle body. The vehicle also includes a radiator assembly disposed between the first end of the vehicle body and the first side. The radiator assembly is spaced from the brake system. In addition, the vehicle includes a power inverter module disposed between the walls adjacent to the distal edge of each of the walls. The power inverter module is coupled to the transmission casing to define a unit. The vehicle further includes a lid attached to the distal edge of each of the walls to contain the power inverter module in the transmission casing and further define the unit. The lid includes a top side opposing the base of the transmission casing. The unit is disposed in a first position when the unit is stationary relative to the first end of the vehicle body and the unit is disposed in a second position when the unit moves toward the second end of the vehicle body. The power inverter module slopes downwardly from the first side toward the second side to define a module angle relative to the longitudinal axis such that the power inverter module defines an angular position. In addition, the top side of the lid slopes downwardly from the first side toward the second side to define a lid angle relative to the longitudinal axis, with the lid angle and the module angle complementary to each other. The top side of the lid and the brake system define a space therebetween when the unit is in the first position, and the space decreases in size during movement of the unit to the second position such that the lid angle minimizes engagement of the lid with the brake system when the unit is in the second position to minimize engagement of the power inverter module with the brake system.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
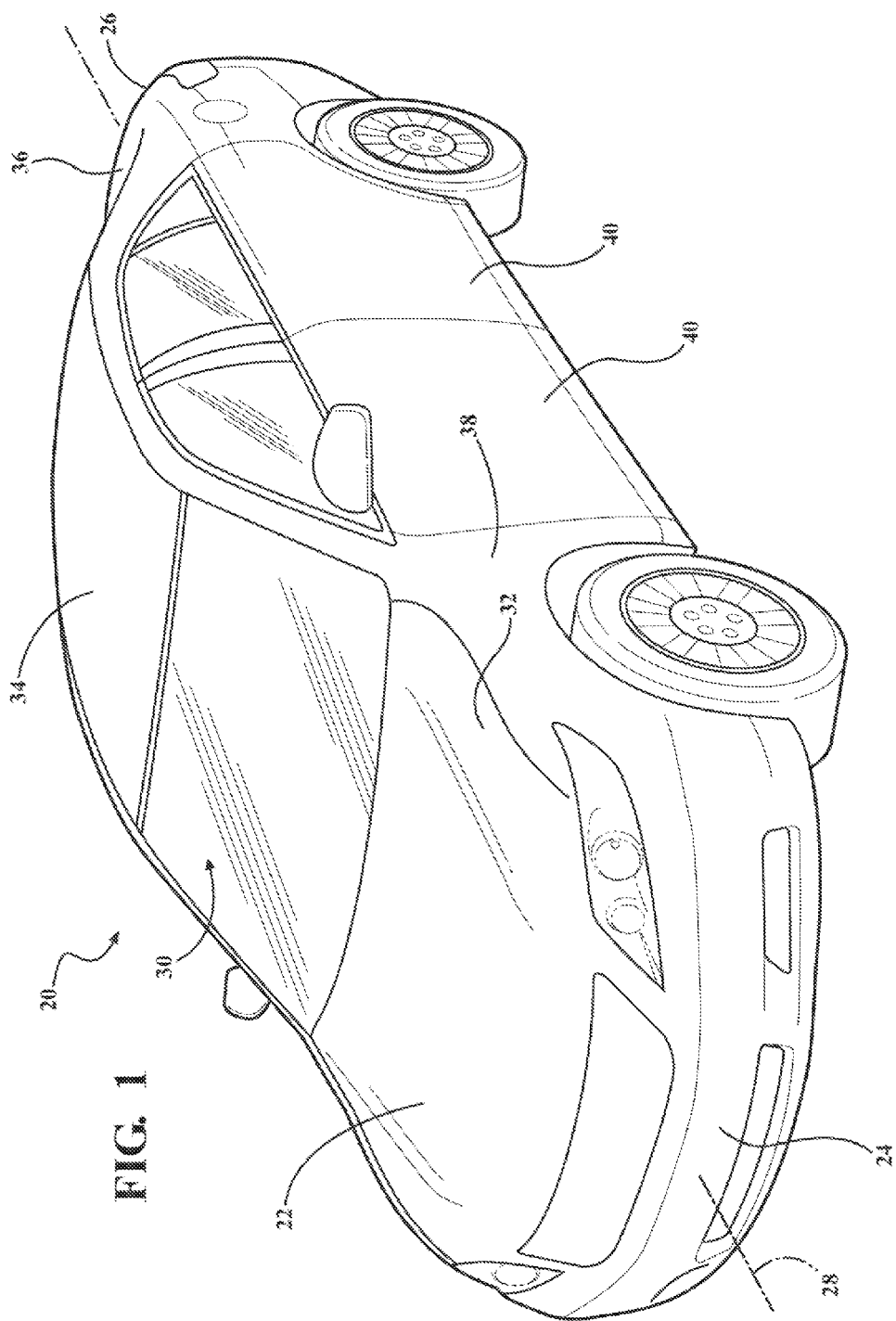
FIG. 1 is a schematic perspective view of a vehicle.

Referring to the Figures, wherein like numerals indicate like or corresponding parts throughout the several views, a vehicle 20 is generally shown in FIG. 1. The vehicle 20 can be a hybrid vehicle 20 or any other suitable vehicle 20. The hybrid vehicle 20 will be discussed further below.

Figure 2:
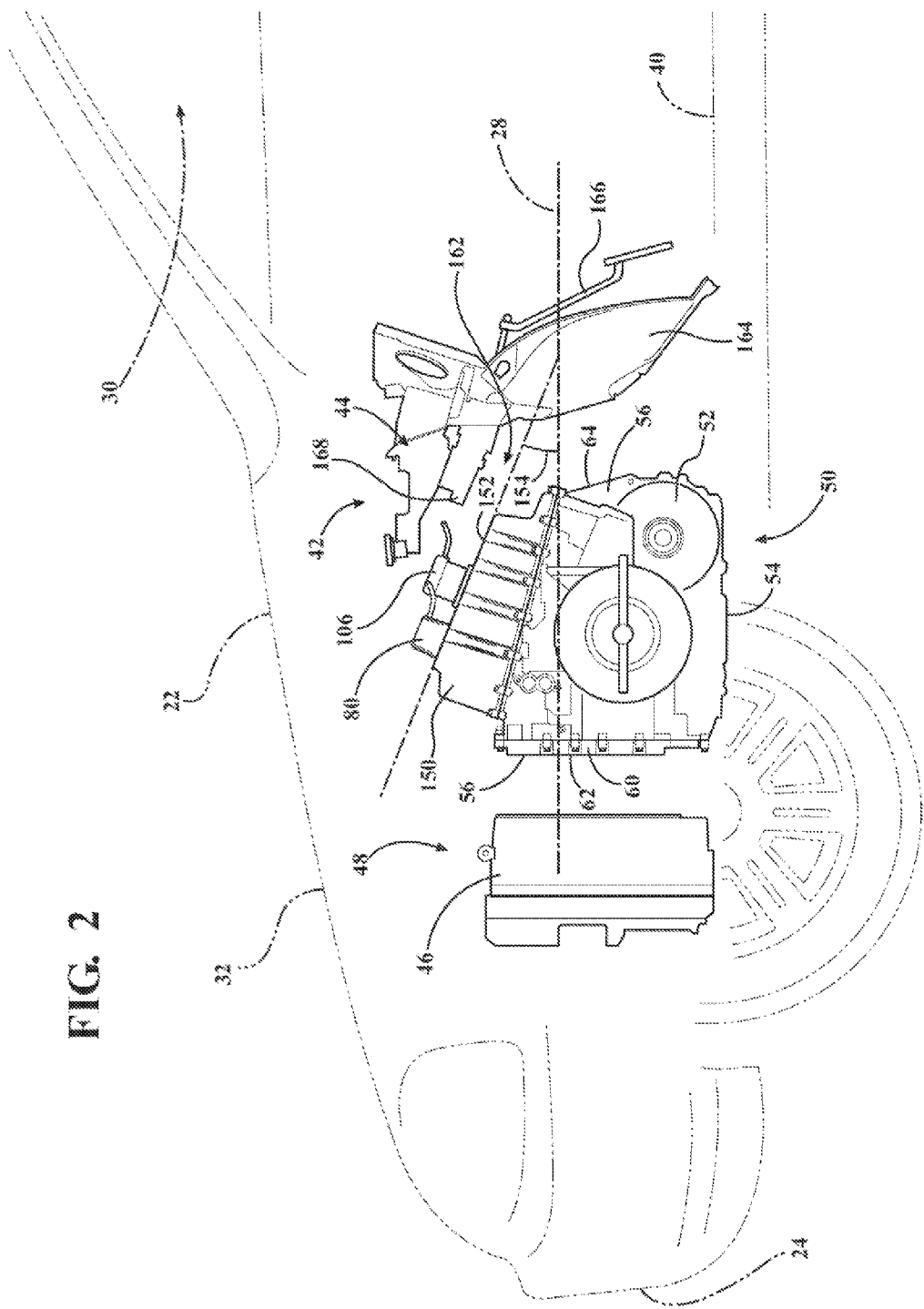
FIG. 2 is a schematic side view of a first component, a second component and a unit in a first position, with a vehicle body in phantom lines.

Turning to FIGS. 1 and 2, the vehicle 20 includes a vehicle body 22. It is to be appreciated a portion of the vehicle body 22 is shown in phantom lines in FIG. 2 for illustrative purposes only. Therefore, as best shown in FIG. 1, the vehicle body 22 includes a first end 24 and a second end 26 spaced from each other along a longitudinal axis 28.

The vehicle body 22 can surround a vehicle compartment 30. Generally, the vehicle compartment 30 is accessible to a driver and/or one or more passengers. In certain embodiments, the vehicle body 22 can be the general body of the vehicle 20, such as one or more of: a hood 32, a roof 34, a trunk 36, one or more quarter panels 38, one or more doors 40, etc. In other embodiments, the vehicle body 22 can be a vehicle frame which supports the hood 32, the roof 34, the trunk 36, the quarter panels 38, the doors 40, etc., of the vehicle 20. In yet other embodiments, the vehicle body 22 can be a unibody having the general body and the vehicle frame formed as one piece or integral.

Figure 3:
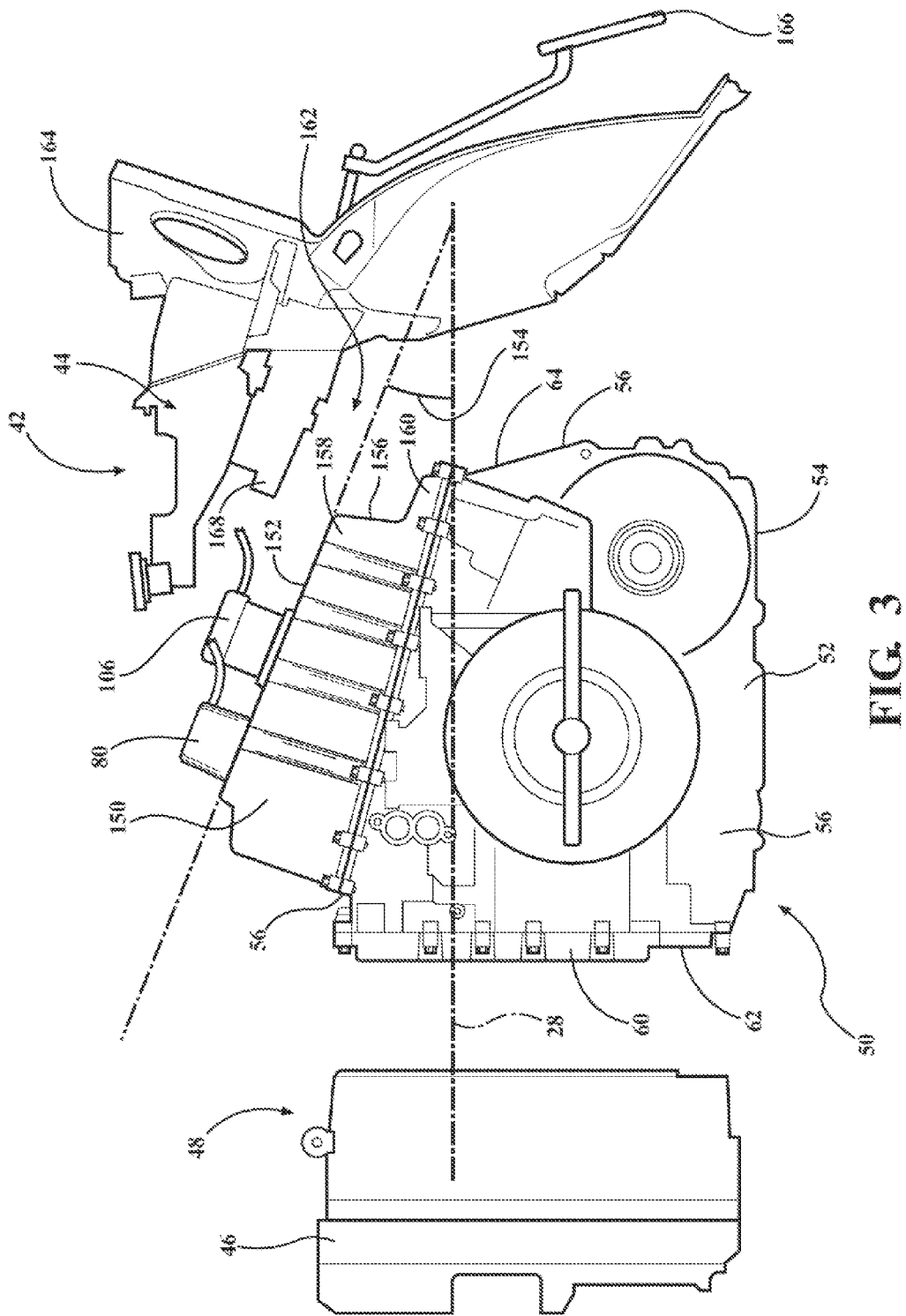
FIG. 3 is a schematic enlarged side view of the first and second components and the unit in the first position from FIG. 2.

Turning to FIGS. 2 and 3, the vehicle 20 also includes a component 42 disposed between the first and second ends 24, 26 of the vehicle body 22. Generally, the component 42 is coupled to the vehicle body 22. The component 42 can be one of a brake system 44 and a radiator assembly 46. In one embodiment, the component 42 is the brake system 44. Therefore, in one embodiment, the brake system 44 is disposed between the first and second ends 24, 26 of the vehicle body 22.

More specifically, the component 42 can be further defined as a first component 42, and the vehicle 20 can further include a second component 48 coupled to the vehicle body 22. In certain embodiments, the first component 42 is the brake system 44 and the second component 48 is the radiator assembly 46. Therefore, the brake system 44 and the radiator assembly 46 can each be coupled to the vehicle body 22. Each of the brake system 44 and the radiator assembly 46 which will be discussed further below.

Continuing with FIGS. 2 and 3, the vehicle 20 can further include a transmission 50. Generally, the transmission 50 is coupled to the vehicle body 22. More specifically, the component 42 and the transmission 50 are secured to the vehicle 20 frame to position the component 42 and the transmission 50 relative to each other. The transmission 50 can be an electrically-variable transmission 50 or any other suitable transmission 50. Electrically-variable transmissions 50 are generally utilized in the hybrid vehicle 20. The electrically-variable transmission 50 will be discussed further below.

The vehicle 20 also includes a transmission casing 52 disposed between the first and second ends 24, 26 of the vehicle body 22. More specifically, the transmission 50 includes the transmission casing 52. Generally, the transmission casing 52 is coupled to the vehicle body 22. Specifically, the transmission casing 52 is secured to the vehicle 20 frame.

Figure 4:
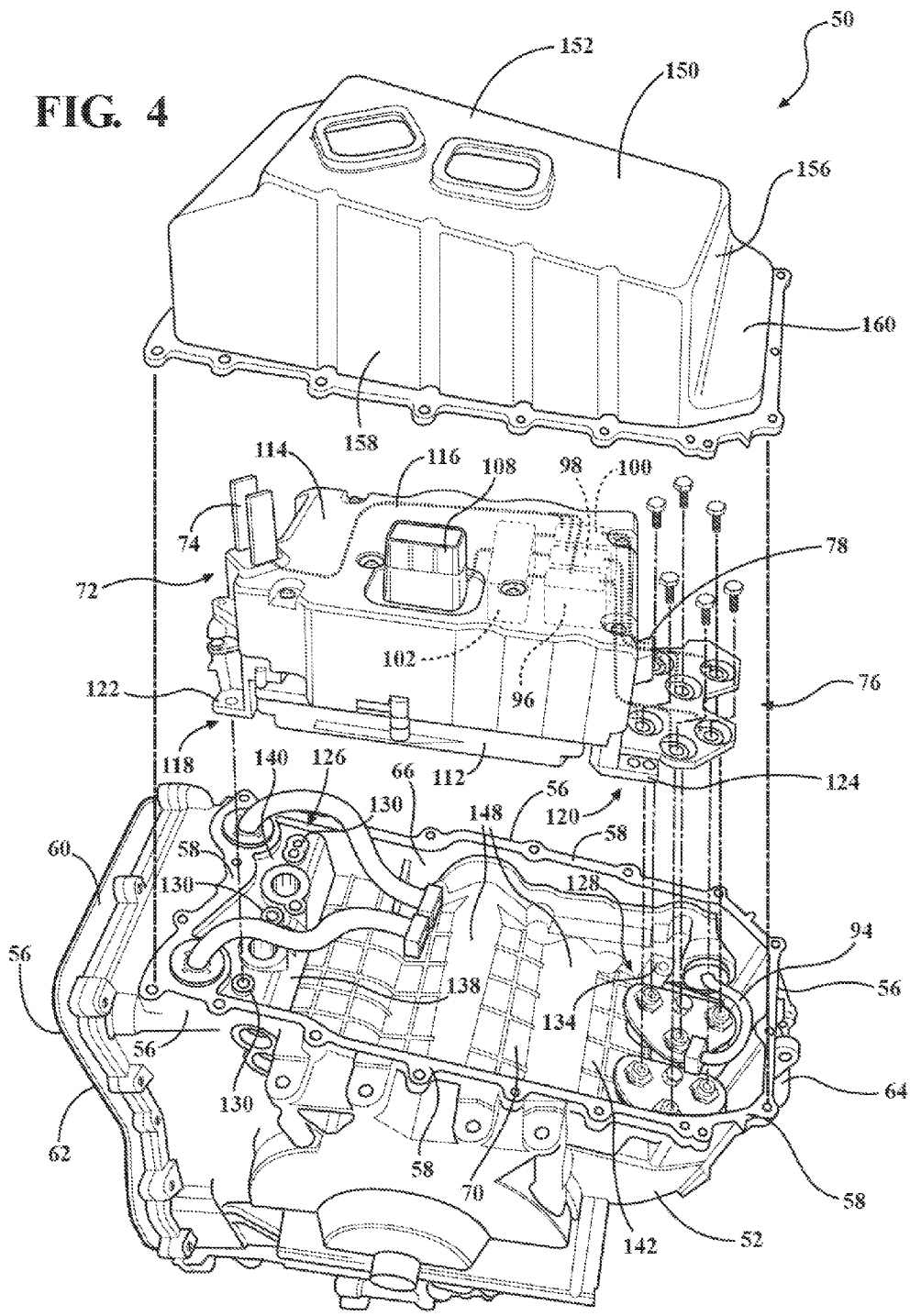
FIG. 4 is a schematic partially exploded perspective view of a transmission.

Referring to FIGS. 2-4, the transmission casing 52 includes a base 54 and a plurality of walls 56 extending outwardly away from the base 54 to a distal edge 58 opposing the base 54. In certain embodiments, one or more walls 56 are integrally formed to the base 54. In other words, one or more walls 56 and the base 54 can be formed of one piece. Furthermore, in certain embodiments, a segment 60 of at least one of the walls 56 can be detachable from the other walls 56.

Generally, one of the walls 56 defines a first side 62 facing the first end 24 of the vehicle body 22 and another one of the walls 56 defines a second side 64 facing the second end 26 of the vehicle body 22. Specifically, the wall 56 defining the first side 62 opposes the wall 56 defining the second side 64. Furthermore, the wall 56 defining the first side 62 and the wall 56 defining the second side 64 are spaced from each other along the longitudinal axis 28.

Figure 5:
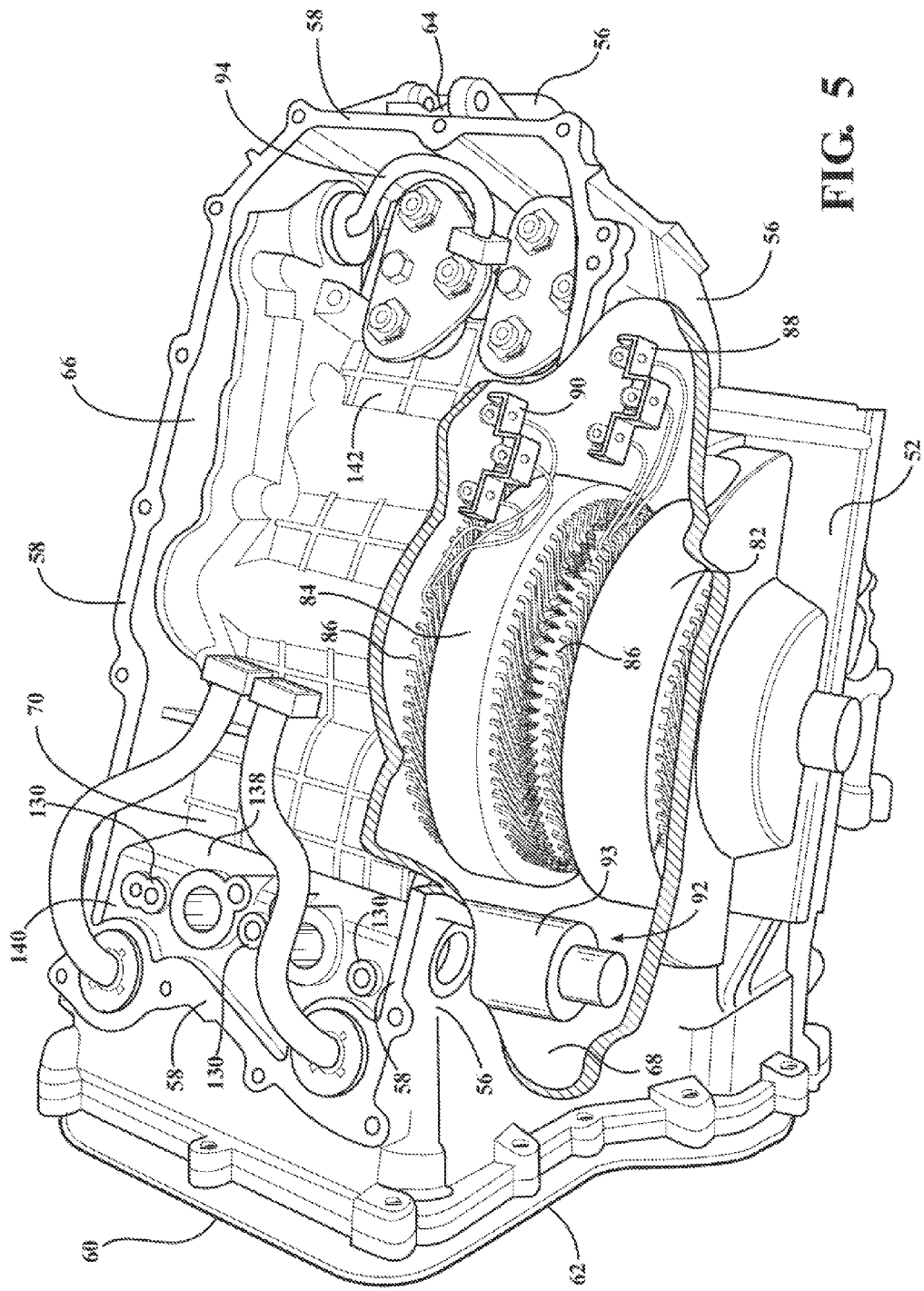
FIG. 5 is a schematic perspective broken view of a transmission casing with a pump, a first motor/generator and a second motor/generator each disposed in a second cavity.

Referring to FIGS. 4 and 5, the transmission casing 52 can define a first cavity 66 and a second cavity 68 inside the transmission casing 52, with the first cavity 66 selectively open to outside of the transmission casing 52. More specifically, the transmission casing 52 defines the first and second cavities 66, 68 between the walls 56. Generally, the first cavity 66 is disposed adjacent to the distal edge 58 of each of the walls 56. Furthermore, the first and second cavities 66, 68 are spaced from each other.

Continuing with FIGS. 4 and 5, in addition, the vehicle 20, and more specifically the transmission 50, can include a platform 70 attached to the transmission casing 52 between the walls 56. The platform 70 can be at least partially disposed inside the transmission casing 52 to separate the first and second cavities 66, 68. Therefore, generally, at least a portion of the platform 70 is disposed inside the transmission casing 52. Furthermore, the platform 70 is disposed between the walls 56 to separate the first and second cavities 66, 68. As such, in certain embodiments, the platform 70 and the first and second cavities 66, 68 are disposed between the walls 56.

The first cavity 66 is configured for receiving a gaseous fluid to define a dry interior. In certain embodiments, the gaseous fluid in the first cavity 66 is air. It is to be appreciated that other gaseous fluids can be disposed in the first cavity 66.

Furthermore, the second cavity 68 is configured for receiving a liquid fluid to define a wet interior. In certain embodiments, the liquid fluid in the second cavity 68 is transmission fluid. Therefore, in certain embodiments, the second cavity 68 is configured for receiving transmission fluid to define the wet interior. For example, the transmission fluid can be automatic transmission fluid (ATF). It is to be appreciated that other liquid fluids can be disposed in the second cavity 68.

The first cavity 66 is generally disposed above the second cavity 68 for maintaining the liquid fluid in the second cavity 68 such that the first cavity 66 defines the dry interior. In other words, the first cavity 66 is generally disposed above the second cavity 68 for maintaining the transmission fluid in the second cavity 68. More specifically, the first cavity 66 is generally disposed above the second cavity 68 for maintaining the transmission fluid in the second cavity 68 such that the first cavity 66 defines the dry interior. Furthermore, the platform 70 separates the first and second cavities 66, 68 to assist in maintaining the liquid fluid in the second cavity 68.

Figure 6:
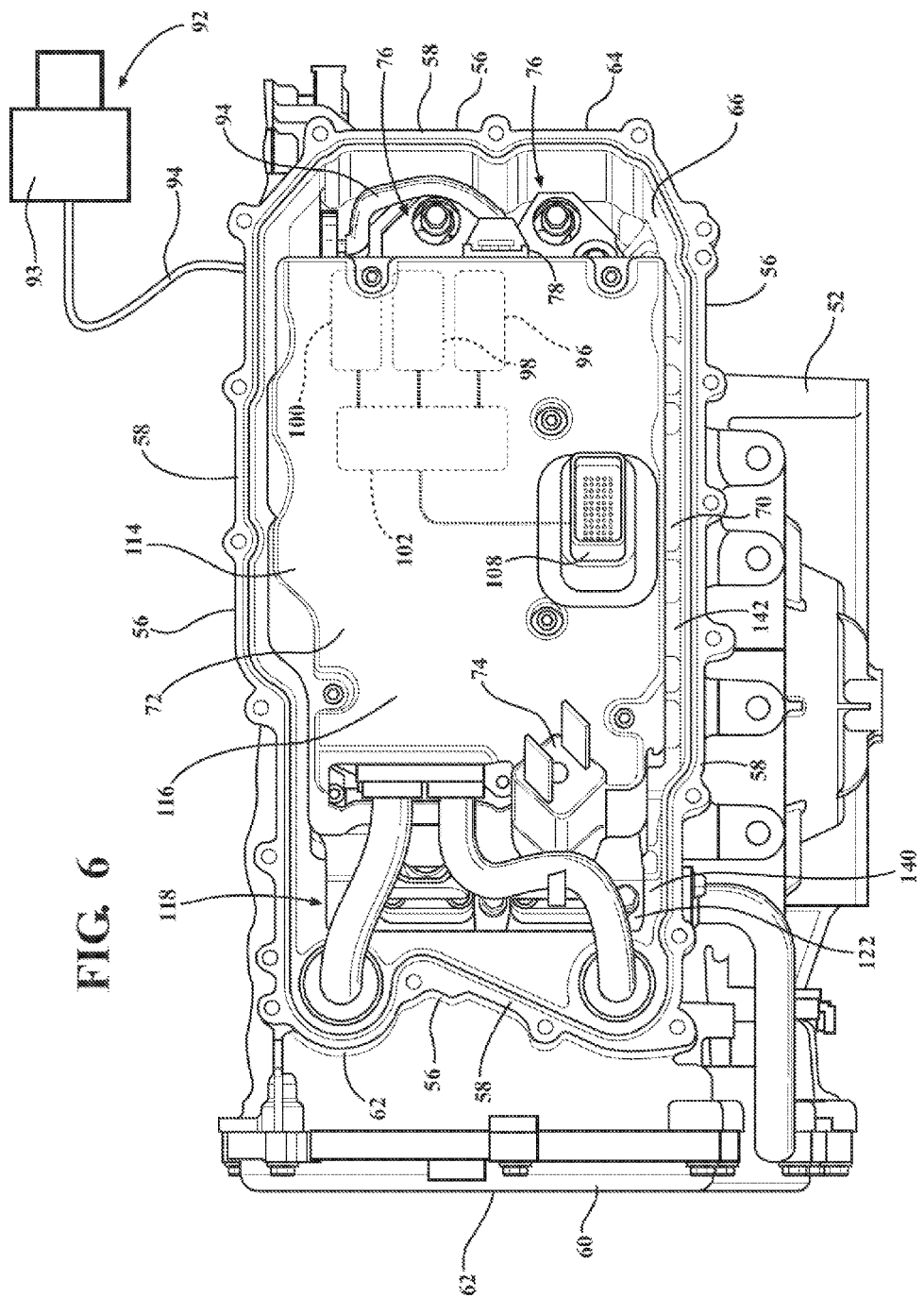
FIG. 6 is a schematic top perspective view of a power inverter module disposed in a first cavity with a lid removed.

Referring to FIGS. 4 and 6, the vehicle 20 also includes a power inverter module 72 disposed between the walls 56 adjacent to the distal edge 58 of each of the walls 56. Simply stated, the power inverter module 72 is disposed along the top of the transmission 50. The power inverter module 72 can define a self-contained unit selectively disposed in the first cavity 66. Generally, the self-contained unit is supported by the platform 70 when in the first cavity 66. Packaging the power inverter module 72 as the self-contained unit provides a compact design, as well as provides easy assembly of the power inverter module 72 to the transmission 50 and easy disassembly of the power inverter module 72 from the transmission 50. Therefore, the power inverter module 72 is self-contained to be dropped into the first cavity 66 as the self-contained unit and integrated into the transmission 50, thus simplifying assembly. Furthermore, the power inverter module 72 is self-contained to allow easy replacement of the power inverter module 72 with another power inverter module 72. In addition, the power inverter module 72 is disposed in the first cavity 66 which defines the dry interior to separate the power inverter module 72 from the liquid fluid in the second cavity 68. It is to be appreciated that the power inverter module 72 can also be referred to as a fraction power inverter module (TPIM).

Generally, the power inverter module 72 is configured for providing electrical energy to various components, some of which are discussed further below. Specifically, the power inverter module 72 is configured for converting direct current energy into alternating current energy. Therefore, the power inverter module 72 converts direct current energy into alternating current energy for various components, some of which are discussed further below.

Turning to FIGS. 4 and 6, the power inverter module 72 can include a first junction 74 for receiving the direct current energy into the self-contained unit. Furthermore, the power inverter module 72 can include a second junction 76 and a third junction 78 each for outputting the alternating current energy from the self-contained unit. Generally, the first, second and third junctions 74, 76, 78 are spaced from each other. It is to be appreciated that the first, second and third junctions 74, 76, 78 can extend from any suitable side of the power inverter module 72.

Figure 7:
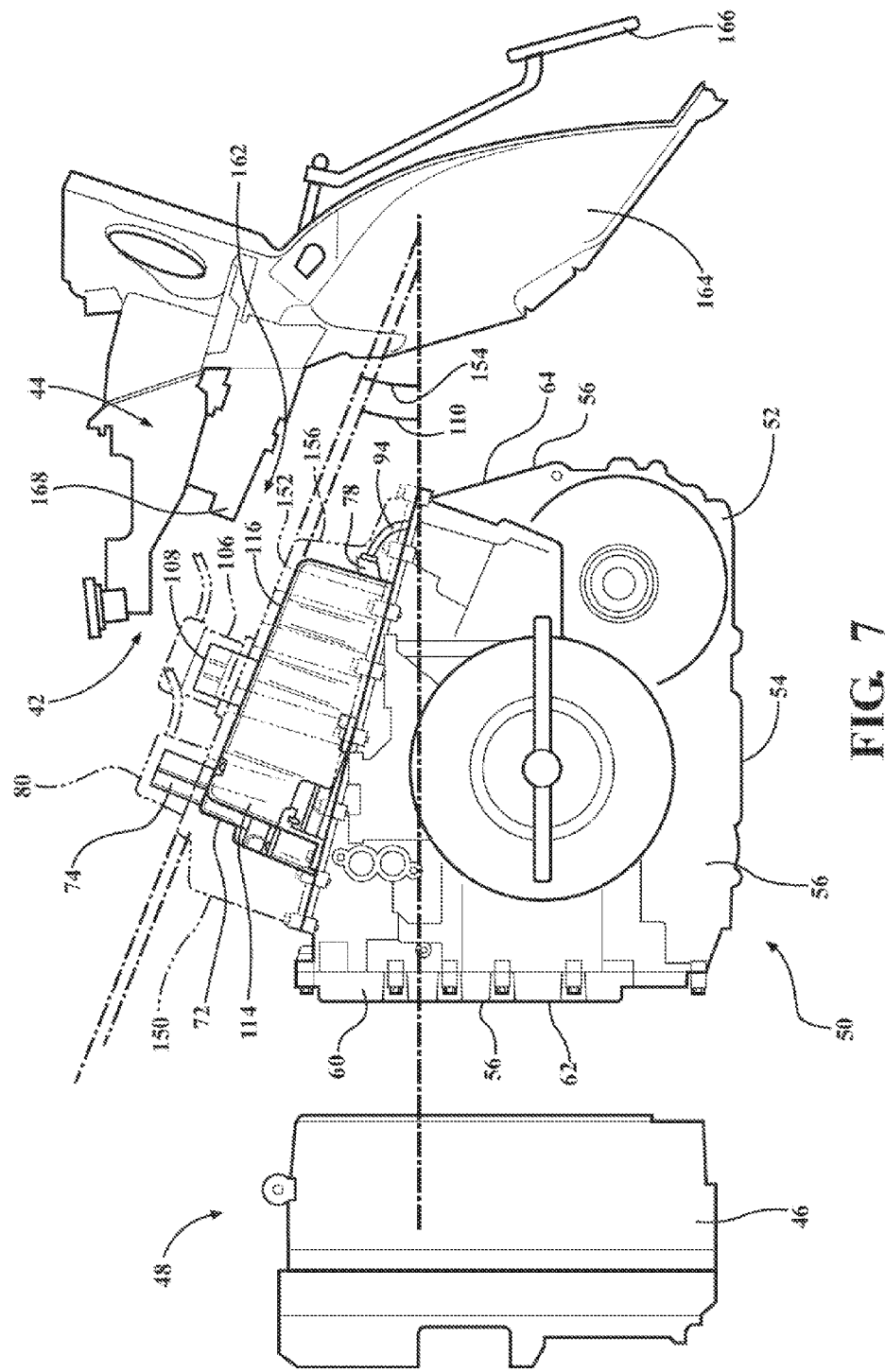
FIG. 7 is a schematic side view of the first and second components and the unit in the first position, with the power inverter module disposed at an angular position, and with the lid, a first cable harness and a wire harness in phantom lines.

As best shown in FIGS. 2, 3 and 7, a first cable harness 80 is coupled to the first junction 74 for delivering or supplying the direct current energy into the power inverter module 72. Therefore, the direct current energy from the first cable harness 80 is delivered into the power inverter module 72 through the first junction 74 and converted into the alternating current energy which exits the power inverter module 72 through the second and third junctions 76, 78. In other words, the alternating current energy is outputted from the power inverter module 72 through the second and third junctions 76, 78.

Turning to FIG. 5, the transmission 50 can also include at least one of a first motor/generator 82 and a second motor/generator 84 disposed in the second cavity 68. More specifically, in certain embodiments, the transmission 50 can include both the first and second motor/generators 82, 84 each disposed in the second cavity 68. Generally, the first and second motor/generators 82, 84 are each electrically connected to the second junction 76 of the power inverter module 72 such that the alternating current energy is delivered or supplied to the first and second motor/generators 82, 84. Therefore, the direct current energy from the first cable harness 80 is delivered into the power inverter module 72 through the first junction 74 and converted into the alternating current energy which exits the power inverter module 72 through the second junction 76 such that the alternating current energy is delivered to the first and second motor/generators 82, 84. It is to be appreciated that the first and second motor/generators 82, 84 are shown schematically in FIG. 5 for illustrative purposes and the configuration/location of the first and second motor/generators 82, 84 can change.

Generally, the first and second motor/generators 82, 84 can each include a rotor and a stator 86 (see FIG. 5). In various embodiments, the first and/or second motor/generators 82, 84 can be referred to as traction motors. Continuing with FIG. 5, the first motor/generator 82 includes a first terminal 88 coupled to the stator 86 of the first motor/generator 82 to electrically connect the stator 86 of the first motor/generator 82 and the power inverter module 72 to each other. In addition, the second motor/generator 84 includes a second terminal 90 coupled to the stator 86 of the second motor/generator 84 to electrically connect the stator 86 of the second motor/generator 84 and the power inverter module 72 to each other. FIG. 5 illustrates the first and second terminals 88, 90 uncoupled from the second junction 76 for illustrative purposes only.

Generally, the electrically-variable transmission 50 can include the first and second motor/generators 82, 84 as discussed above. Therefore, the power inverter module 72 is utilized to supply the alternating current energy to the first and second motor/generators 82, 84, as well as to control the first and second motor/generators 82, 84 as discussed further below. As indicated above, electrically-variable transmissions 50 can be utilized in hybrid vehicles 20. It is to be appreciated that the transmission 50 can include other components not specifically discussed herein. It is to also be appreciated that the transmission 50 can be utilized for vehicles 20 other than hybrid vehicles 20 as also discussed above.

Furthermore, in certain embodiments, the transmission 50 can further include a pump 92 (see FIGS. 5 and 6) electrically connected to third junction 78 of the power inverter module 72 such that the alternating current energy is delivered or supplied to the pump 92. In one embodiment, the pump 92 can be disposed in the second cavity 68 of the transmission casing 52 (see FIG. 5). Turning to FIGS. 5 and 6, the pump 92 can include a motor 93 electrically connected to the third junction 78 of the power inverter module 72 such that the alternating current energy is delivered or supplied to the motor 93 of the pump 92. More specifically, the direct current energy from the first cable harness 80 is delivered into the power inverter module 72 through the first junction 74 and converted into the alternating current energy which exits the power inverter module 72 through the third junction 78 such that the alternating current energy is delivered to the pump 92, and specifically, to the motor 93 of the pump 92. A second cable harness 94 (see FIG. 6) can be coupled to the third junction 78 and the motor 93 of the pump 92 to deliver the alternating current energy from the power inverter module 72 to the pump 92. It is to be appreciated that the pump 92 is shown schematically in FIGS. 5 and 6 for illustrative purposes only and the configuration/location of the pump 92 can change.

Figure 8:
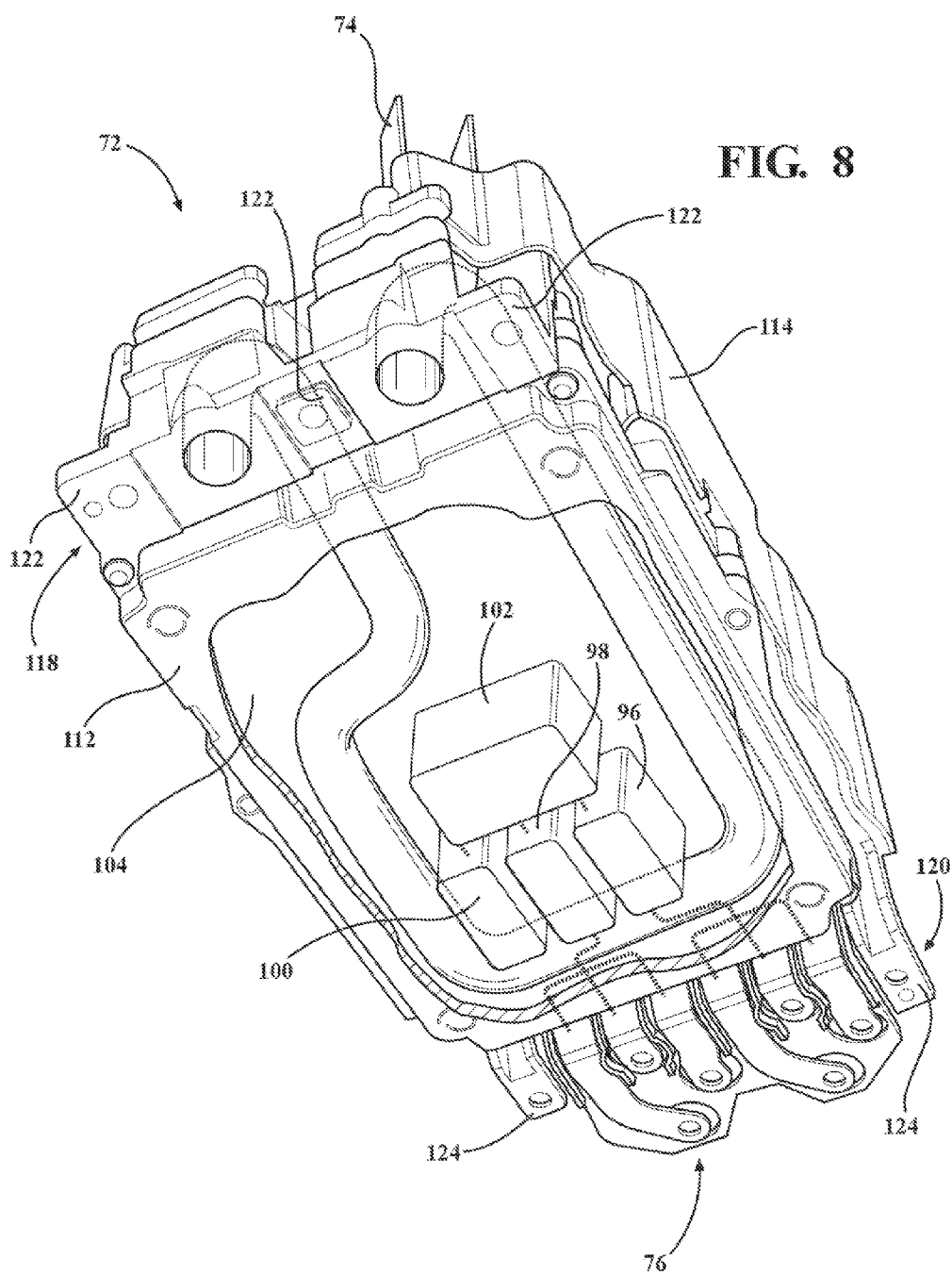
FIG. 8 is a schematic bottom perspective broken view of the power inverter module.

Turning to FIGS. 4, 6, 8 and 13, the power inverter module 72 can include a first inverter 96 electrically connected to the first motor/generator 82 for delivering or supplying alternating current energy to the first motor/generator 82. The power inverter module 72 can further include a second inverter 98 electrically connected to the second motor/generator 84 for delivering or supplying alternating current energy to the second motor/generator 84. Therefore, the direct current energy from the first cable harness 80 is converted into the alternating current energy in the first and second inverters 96, 98. As such, the first cable harness 80 is coupled to the first and second inverters 96, 98 through the first junction 74. Thus, the first and second inverters 96, 98 are electrically connected to the first junction 74. It is to be appreciated that the first and second inverters 96, 98 are shown schematically in the power inverter module 72 of FIGS. 4, 6 and 8 for illustrative purposes only and the configuration/location of the first and second inverters 96, 98 can change. It is to also be appreciated that some of the electrical connections are shown in FIGS. 4 and 8.

Continuing with FIGS. 4, 6, 8 and 13, in addition, the power inverter module 72 can include a third inverter 100 electrically connected to the motor 93 of the pump 92 for delivering or supplying alternating current energy to the motor 93 of the pump 92 through the third junction 78. Specifically, the alternating current energy is delivered to the motor 93 of the pump 92 through the third junction 78 and the second cable harness 94. Therefore, the direct current energy from the first cable harness 80 is converted into the alternating current energy in the third inverter 100. As such, the first cable harness 80 is coupled to the third inverter 100 through the first junction 74. Thus, the third inverter 100 is electrically connected to the first junction 74. It is to be appreciated that the third inverter 100 is shown schematically in the power inverter module 72 of FIGS. 4, 6 and 8 for illustrative purposes only and the configuration/location of the third inverter 100 can change. As discussed above, it is to also be appreciated that some of the electrical connections are shown in FIGS. 4 and 8.

Turning to FIGS. 4, 6, 8, 13 and 14, the power inverter module 72 can include a controller 102 coupled to at least one of the first, second and third inverters 96, 98, 100 for controlling at least one of the motor 93 of the pump 92 and the first and second motor/generators 82, 84. In certain embodiments, the controller 102 is coupled to the first, second and third inverters 96, 98, 100 for controlling the first and second motor/generators 82, 84 and the motor 93 of the pump 92. In other words, the controller 102 is in communication with the first, second and third inverters 96, 98, 100. It is to be appreciated that the controller 102 is shown schematically in the power inverter module 72 of FIGS. 4, 6 and 8 for illustrative purposes only and the configuration/location of the controller 102 can change. It is to further be appreciated that more than one controller 102 can be disposed in the power inverter module 72. It is to also be appreciated that some of the connections are shown in FIGS. 6 and 8.

The controller 102 and the first, second and third inverters 96, 98, 100 are each disposed in the self-contained unit of the power inverter module 72 (see FIGS. 4, 6 and 8). In other words, the controller 102, and the first, second and third inverters 96, 98, 100 are each disposed in a hollow 104 of the power inverter module 72. As such, packaging of the controller 102 and the first, second and third power inverters 96, 98, 100 in the self-contained unit of the power inverter module 72 provides a compact design, as well as provides easy assembly of the power inverter module 72 to the transmission casing 52 and easy disassembly of the power inverter module 72 from the transmission casing 52.

A wire harness 106 (see FIGS. 2, 3 and 7) is electrically connected to at least one of the controller 102 and the first, second and third inverters 96, 98, 100. More specifically, the wire harness 106 connects the controller 102 to other vehicle 20 systems such that the controller 102 can communicate with other vehicle 20 systems. A connection plug 108 (see FIGS. 4, 6 and 7) can extend from the power inverter module 72 and cooperates with the wire harness 106 such that the wire harness 106 can engage the connection plug 108. Furthermore, the connection plug 108 and the controller 102 are in communication with each other (see FIGS. 4 and 14). Therefore, the wire harness 106 is coupled to the controller 102 through the connection plug 108 such that the wire harness 106 and the controller 102 are in communication with each other. It is to be appreciated that the first and second cable harnesses 80, 94 and the wire harness 106 are shown schematically for illustrative purposes.

The power inverter module 72 is coupled to the transmission casing 52 to define a unit. In other words, when the power inverter module 72 is attached or secured to the transmission casing 52, these two elements define the unit. The unit is disposed in a first position when the unit is stationary relative to the first end 24 of the vehicle body 22 and the unit is disposed in a second position when the unit moves toward the second end 26 of the vehicle body 22. In other words, the power inverter module 72 and the transmission casing 52 together can be stationary relative to the first end 24 of the vehicle body 22 or can move together toward the second end 26 of the vehicle body 22. The unit is in the first position in FIGS. 2, 3 and 7, and the unit is in the second position in FIGS. 11 and 12.

Generally, as shown in FIG. 7, the power inverter module 72 slopes downwardly from the first side 62 toward the second side 64 to define a module angle 110 relative to the longitudinal axis 28 such that the power inverter module 72 defines an angular position. In other words, the power inverter module 72 slopes downwardly from the wall 56 defining the first side 62 toward the wall 56 defining the second side 64. Therefore, when the power inverter module 72 is secured to the transmission casing 52, the power inverter module 72 presents the angular position. The angular position of the power inverter module 72 minimizes engagement of the power inverter module 72 with the component 42 when the unit is in the second position. In other words, in certain embodiments, the module angle 110 minimizes engagement of the power inverter module 72 with the brake system 44 when the unit is in the second position.

In certain embodiments, the module angle 110 is from about 15 to about 30 degrees relative to the longitudinal axis 28. In other embodiments, the module angle 110 is from about 20 to about 25 degrees relative to the longitudinal axis 28. In one embodiment, the module angle 110 is about 22 degrees.

Turning to FIGS. 4, 6 and 8, more specifically, in certain embodiments, the power inverter module 72 can include a bottom 112 selectively coupled to the platform 70 and a cover 114 coupled to the bottom 112. The bottom 112 and the cover 114 cooperate to further define the self-contained unit. In other words, the base 54 and the cover 114 cooperate to define the hollow 104 therein, with various components of the power inverter module 72 disposed in the hollow 104, such as the controller 102 and the first, second and third inverters 96, 98, 100, as discussed above.

As best shown in FIG. 6, the cover 114 presents a top surface 116 opposing the bottom 112 of the power inverter module 72. When the power inverter module 72 is secured to the transmission casing 52, the power inverter module 72 presents the angular position such that the top surface 116 of the power inverter module 72 defines the module angle 110.

The bottom 112 of the power inverter module 72 can be coupled or attached to the platform 70 to secure the power inverter module 72 to the transmission casing 52, and more specifically, secure the power inverter module 72 to the platform 70. Securing the power inverter module 72 to the platform 70 positions the power inverter module 72 relative to the walls 56 in the first cavity 66 as further discussed below. In other words, as best shown in FIG. 8, the power inverter module 72 can include a first attachment portion 118 and a second attachment portion 120 spaced from each other along the longitudinal axis 28, with each of the first and second attachment portions 118, 120 disposed adjacent to the bottom 112. The first and second attachment portions 118, 120 are coupled or attached to the platform 70 to secure the power inverter module 72 to the transmission casing 52, and more specifically, secure the power inverter module 72 to the platform 70.

Furthermore, the first attachment portion 118 can include a plurality of first feet 122 and the second attachment portion 120 can include a plurality of second feet 124. Therefore, uncoupling or detaching the bottom 112 of the power inverter module 72 from the platform 70 allows the self-contained unit to be easily removed and replaced by another power inverter module 72. It is to be appreciated that any suitable number of first and second feet 122, 124 can be utilized.

Figure 9:
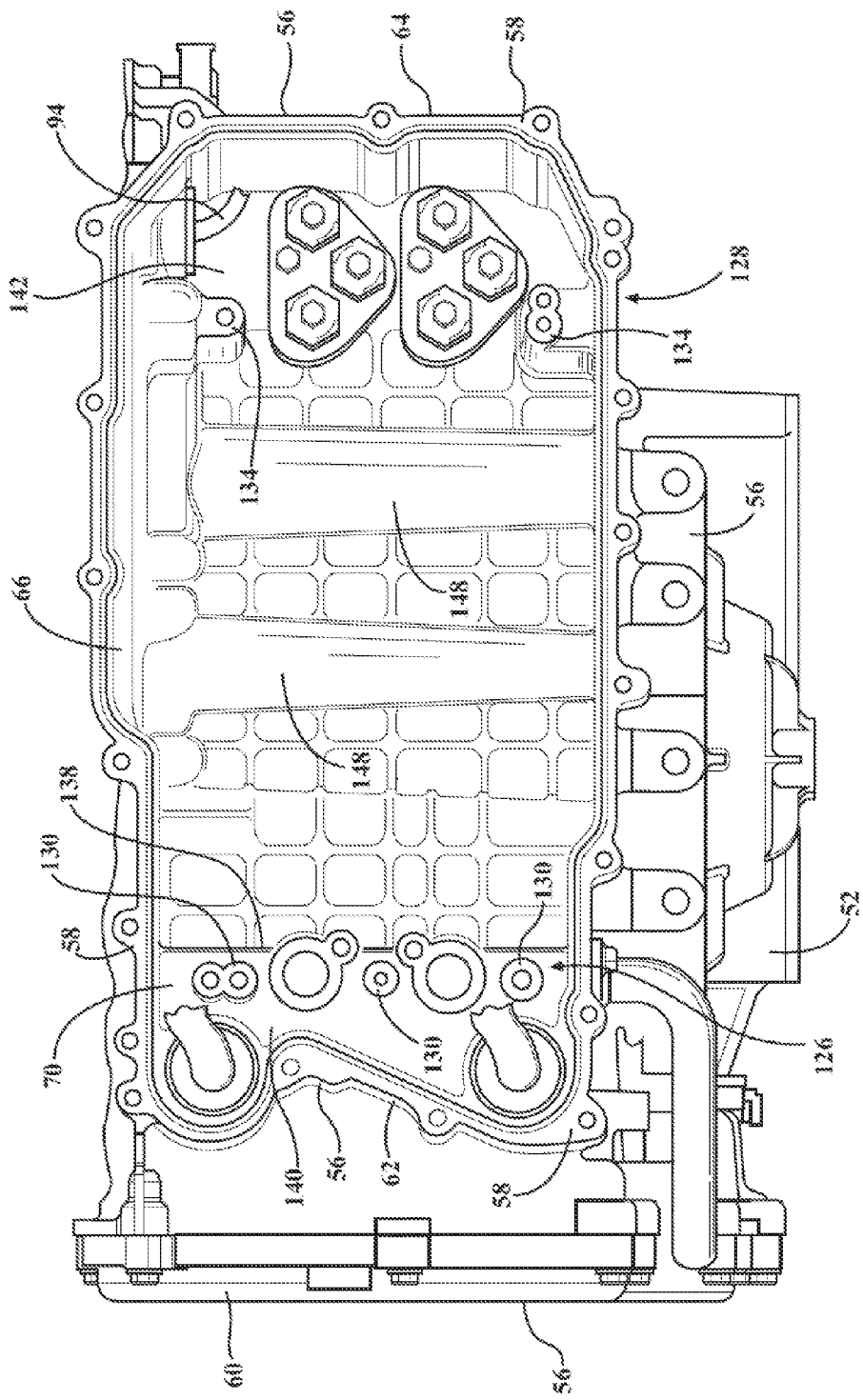
FIG. 9 is a schematic top perspective view of the transmission casing, with the power inverter module and the lid removed.

As mentioned above, the platform 70 can be attached to the transmission casing 52 between the walls 56. In certain embodiments, the power inverter module 72 is supported by the platform 70 in the angular position. Therefore, as shown in FIGS. 4, 5 and 9 the platform 70 can include a first mounting portion 126 and a second mounting portion 128 spaced from each other along the longitudinal axis 28. The power inverter module 72 is attached to the first and second mounting portions 126, 128 to secure the power inverter module 72 to the platform 70 relative to the walls 56 in the angular position. More specifically, the first attachment portion 118 of the power inverter module 72 is attached to the first mounting portion 126 and the second attachment portion 120 of the power inverter module 72 is attached to the second mounting portion 128.

Continuing with FIGS. 4, 5 and 9, the first mounting portion 126 can include a plurality of first footings 130 spaced from each other and each extending from the platform 70 to define a first height 132 transverse to the longitudinal axis 28. Furthermore, the second mounting portion 128 can include a plurality of second footings 134 spaced from each other and each extending from the platform 70 to define a second height 136 transverse to the longitudinal axis 28. More specifically, the first and second footings 130, 134 each extend outwardly away from the second cavity 68. Generally, the first feet 122 of the bottom 112 of the power inverter module 72 cooperate with the first footings 130 and the second feet 124 of the bottom 112 of the power inverter module 72 cooperate with the second footings 134. In other words, the first feet 122 are secured to the first footings 130 and the second feet 124 are secured to the second footings 134. It is to be appreciated that any suitable number of first and second footings 130, 134 can be utilized.

In certain embodiments, the first height 132 is less than the second height 136 such that the first and second footings 130, 134 cooperate to orientate the power inverter module 72 in the angular position. Therefore, when the power inverter module 72 is attached to the first and second footings 130, 134, the power inverter module 72 is positioned in the angular position and thus orientated in the module angle 110. In other words, when the power inverter module 72 is attached to the first and second footings 130, 134, the power inverter module 72 is positioned in the angular position, and thus the top surface 116 of the cover 114 of the power inverter module 72 is orientated in the module angle 110.

Figure 10:
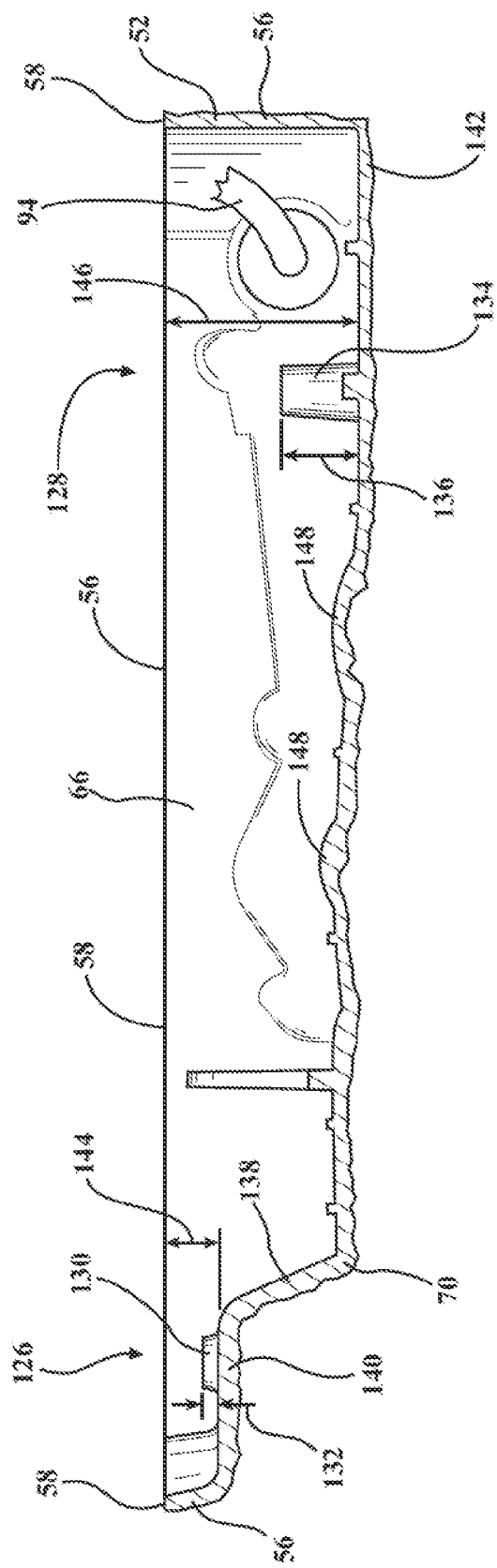
FIG. 10 is a schematic rotated cross-sectional view of the platform such that a distal edge of each wall appears horizontal.

As best shown in FIGS. 4, 5 and 10, the platform 70 can include a step 138 separating a first part 140 of the platform 70 and a second part 142 of the platform 70. In various embodiments, the first mounting portion 126 is attached to the first part 140 of the platform 70 and the second mounting portion 128 is attached to the second part 142 of the platform 70. Therefore, in certain embodiments, the first footings 130 of the first mounting portion 126 each extend from the first part 140 of the platform 70 to define the first height 132 transverse to the longitudinal axis 28 and the second footings 134 of the second mounting portion 128 each extend from the second part 142 of the platform 70 to define the second height 136 transverse to the longitudinal axis 28. Generally, the first height 132 less than the second height 136 such that the first and second parts 140, 142 and the first and second footings 130, 134 cooperate to orientate the power inverter module 72 in the angular position. In other words, the first and second parts 140, 142 and the first and second footings 130, 134 cooperate to orientate the power inverter module 72 in the module angle 110, and more specifically, orientate the top surface 116 of the cover 114 of the power inverter module 72 in the module angle 110. It is to be appreciated that the platform 70 can be configured differently such that the first and second footings 130, 134 can be configured differently, for example, the height of the footings 130, 134 can be changed. It is to also be appreciated that the first and second feet 122, 124 of the power inverter module 72 can be configured differently such that the platform 70 and/or the first and second footings 130, 134 can be configured differently.

The power inverter module 72 is attached to the first and second mounting portions 126, 128 to secure the power inverter module 72 to the platform 70 relative to the walls 56 in the angular position. As mentioned above, the step 138 separates the first and second parts 140, 142 of the platform 70. Generally, the first part 140 is disposed a first distance 144 from the distal edge 58 of at least one of the walls 56 transverse to the longitudinal axis 28 and the second part 142 is disposed a second distance 146 from the distal edge 58 of the same one of the walls 56 measuring the first distance 144. In certain embodiments, the first distance 144 is less than the second distance 146. Simply stated, the first and second distances 144, 146 are measured from the distal edge 58 of the same wall 56. For example, as shown in FIG. 10, the first and second distances 144, 146 are measured from the wall 56 defining the first side 62. As shown in FIG. 10, the platform 70 can be sloped. In other words, the first and second parts 140, 142 of the platform 70 can be sloping. It is to be appreciated that FIG. 10 has been rotated for illustrative purposes only such that the distal edge 58 of the walls 56 appear horizontal, but as best shown in FIG. 3, the distal edge 58 of the walls 56 are sloping. Therefore; in FIG. 10, the platform 70 does not appear as sloped as it would be if the Figure had not be rotated. It is to be appreciated that the first and/or second parts 140, 142 of the platform 70 can have one or more bumps 148 and/or configured flat, horizontal, etc. It is to also be appreciated that the first and second footings 130, 134 can be configured differently such that the first and/or second parts 140, 142 of the platform 70 can be configured differently. It is to further be appreciated that the distal edge 58 of the walls 56 can be configured differently, for example, the distal edge 58 of one or more walls 56 can be flat or horizontal.

As best shown in FIGS. 3 and 4, the vehicle 20, and more specifically, the transmission 50 can further include a lid 150 attached to the distal edge 58 of each of the walls 56 to contain the power inverter module 72 in the transmission casing 52. In other words, the lid 150 is attached to the transmission casing 52 to contain the power inverter module 72 inside the first cavity 66. Generally, the lid 150 further defines the unit; and therefore, the unit can include the transmission casing 52, the power inverter module 72 and the lid 150. As such, the lid 150, the power inverter module 72 and the transmission casing 52 together can be stationary relative to the first end 24 of the vehicle body 22 when in the first position or can move together toward the second end 26 of the vehicle body 22 when in the second position.

More specifically, the lid 150 can be movable between an engaged position attached to the distal edge 58 of each of the walls 56 for containing the power inverter module 72 in the first cavity 66 of the transmission casing 52 and a disengaged position detached from the distal edge 58 of each of the walls 56 for removing the power inverter module 72 from the first cavity 66 of the transmission casing 52 as the self-contained unit. Therefore, generally, the lid 150 is disposed in the engaged position when attached to the transmission casing 52 and the lid 150 is disposed in the disengaged position when detached from the transmission casing 52. The lid 150 is shown in the engaged position in FIGS. 2, 3, 7, 11 and 12 and the lid 150 is shown in the disengaged position in FIG. 4.

Referring to FIGS. 2, 3 and 7, the lid 150 can include a top side 152 opposing the base 54 of the transmission casing 52. Generally, the top side 152 of the lid 150 slopes downwardly from the first side 62 toward the second side 64 to define a lid angle 154 relative to the longitudinal axis 28. In other words, the top side 152 of the lid 150 slopes downwardly from the wall 56 defining the first side 62 toward the wall 56 defining the second side 64 to define the lid angle 154. Specifically, the lid angle 154 and the module angle 110 are complementary to each other. Therefore, the lid angle 154 minimizes engagement of the lid 150 with the component 42 when the unit is in the second position to minimize engagement of the power inverter module 72 with the component 42. In other words, in certain embodiments, the lid angle 154 minimizes engagement of the lid 150 with the brake system 44 when the unit is in the second position, which therefore minimizes engagement of the power inverter module 72 with the brake system 44.

Generally, in certain embodiments, the lid angle 154 is from about 15 to about 30 degrees relative to the longitudinal axis 28. In other embodiments, the lid angle 154 is from about 20 to about 25 degrees relative to the longitudinal axis 28. In various embodiments, the lid angle 154 is equal to the module angle 110. In one embodiment, the lid angle 154 is about 22 degrees.

Figure 11:
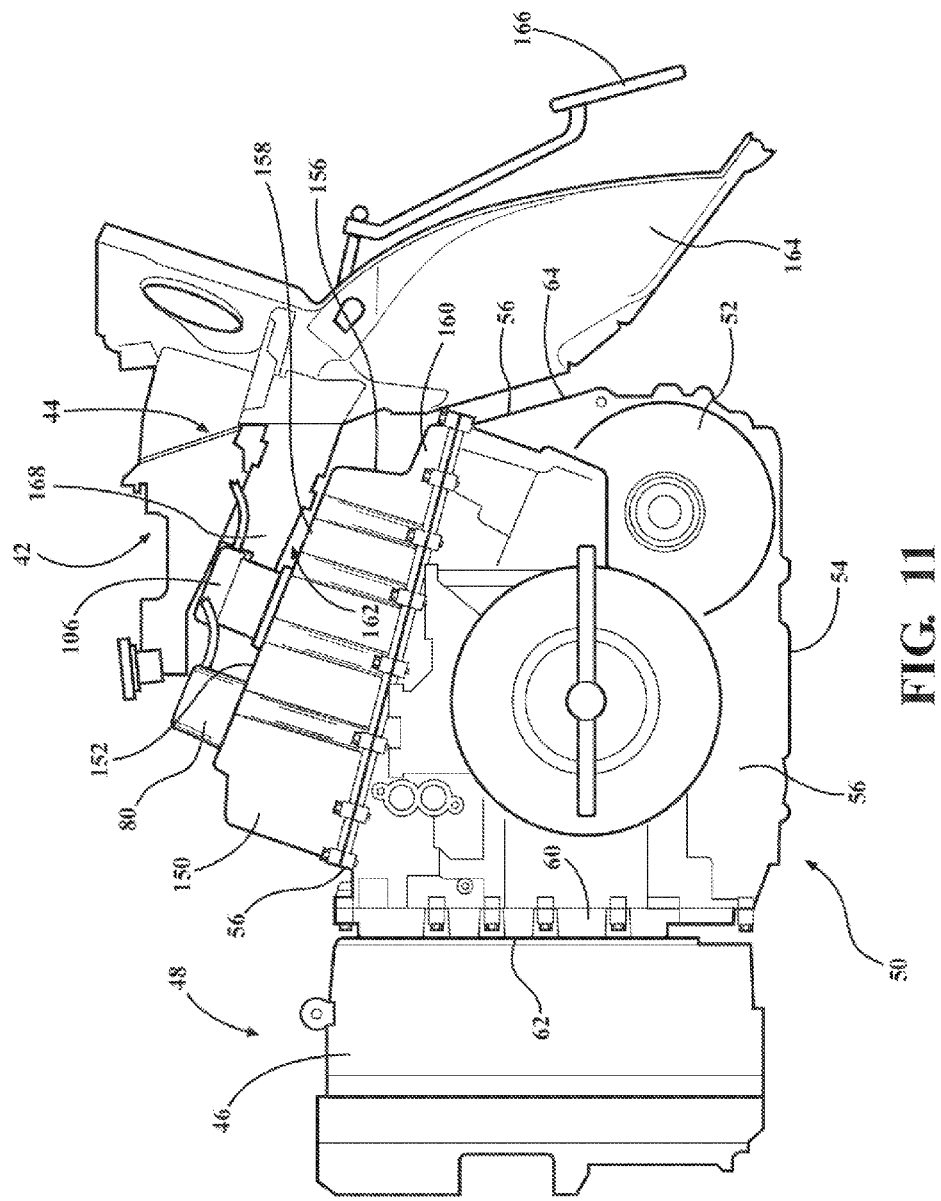
FIG. 11 is a schematic side view of the first and second components and the unit in a second position.
Figure 12:
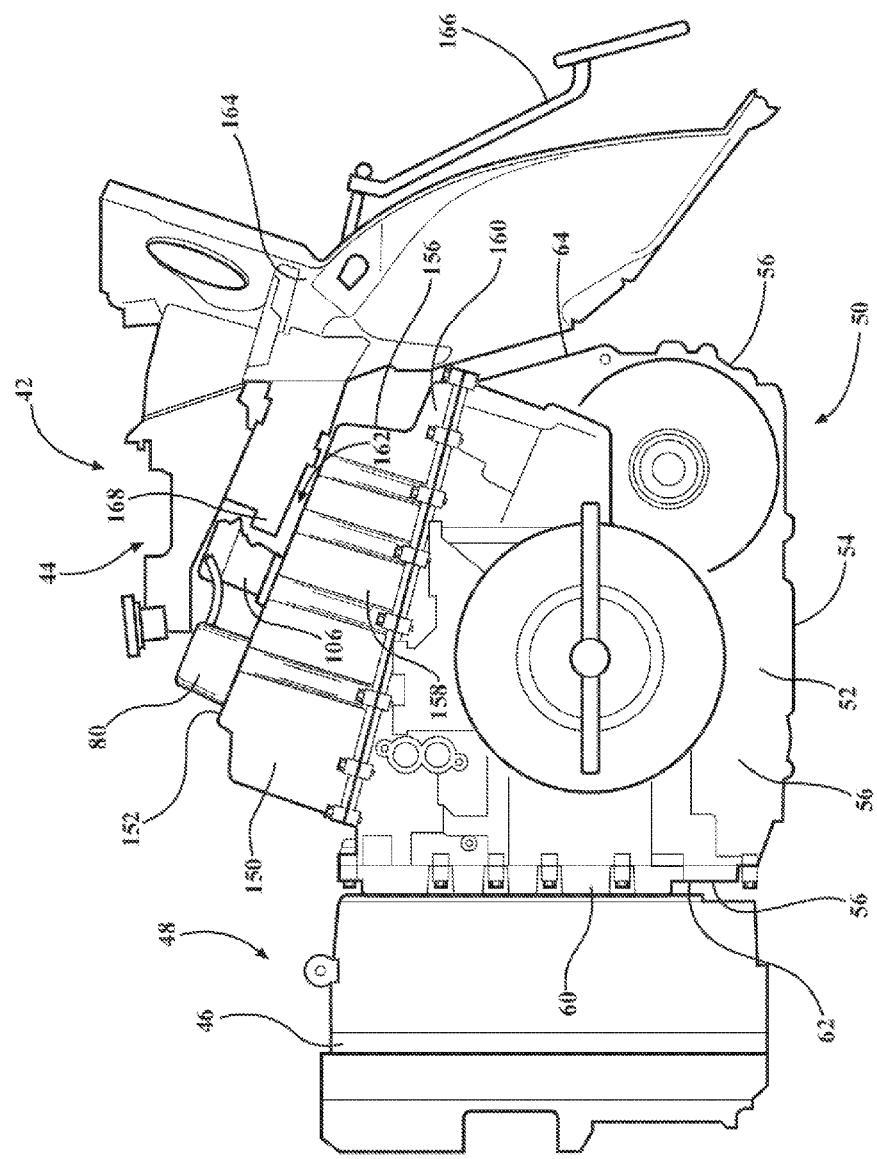
FIG. 12 is a schematic side view of the first and second components and the unit in the second position, with the wire harness and a connection plug partially broken away.
Figure 13:
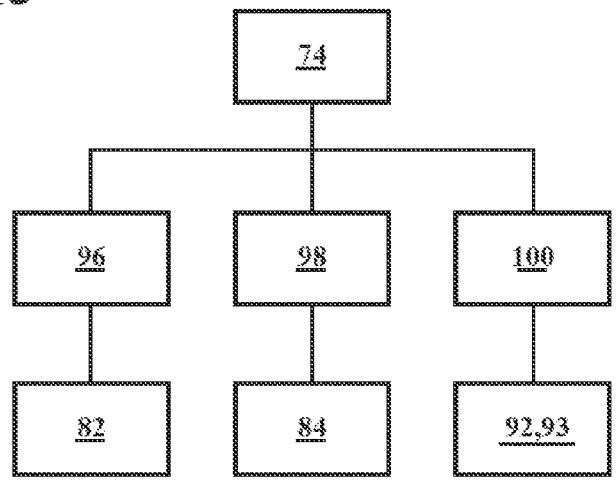
FIG. 13 is a schematic of a first junction in communication with a first inverter, a second inverter and a third inverter, with the first inverter in communication with the first motor/generator, and with the second inverter in communication with the second motor/generator, and with the third inverter in communication with a motor of the pump.
Figure 14:
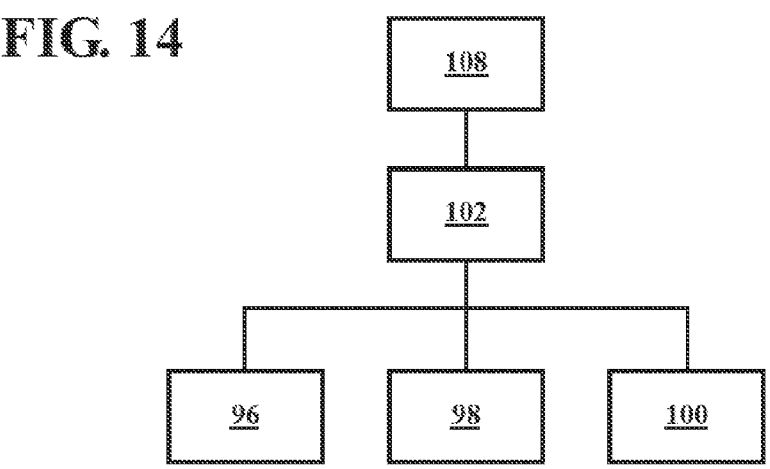
FIG. 14 is a schematic of the connection plug in communication with a controller, and with the controller in communication with the first, second and third inverters.

Turning to FIGS. 3 and 4, the top side 152 of the lid 150 can include a shoulder 156 separating a first segment 158 of the top side 152 and a second segment 160 of the top side 152. Generally, the top side 152 of the lid 150 and the component 42, such as the brake system 44, define a space 162 therebetween when the unit is in the first position. More specifically, the first segment 158 and the component 42 define the space 162 therebetween when the unit is in the first position. Even more specifically, the top side 152 of the first segment 158 and the component 42 define the space 162 therebetween when the unit is in the first position. Generally, the space 162 decreases in size during movement of the unit to the second position such that the lid angle 154 minimizes engagement of the lid 150 with the component 42 when in the second position to minimize engagement of the power inverter module 72 with the component 42. As shown in FIGS. 11 and 12, when the unit is in the second position, the space 162 has decreased in size. In FIG. 11, the component 42 is behind the connection plug 108 when the unit is in the second position; therefore, the component 42 does not engage the connection plug 108 when the unit is in the second position. In FIG. 12, a portion of the connection plug 108 and a portion of the wire harness 106 have been removed to further illustrate the space 162 decreased in size.

As mentioned above, in certain embodiments, the component 42 is the brake system 44. Therefore, the space 162 decreases in size during movement of the unit to the second position such that the lid angle 154 minimizes engagement of the lid 150 with the brake system 44 when the unit is in the second position to minimize engagement of the power inverter module 72 with the brake system 44. Specifically, the first segment 158 of the lid 150 and the brake system 44 can define the space 162 therebetween when the unit is in the first position. And, more specifically, the top side 152 of the first segment 158 of the lid 150 and the brake system 44 can define the space 162 therebetween when the unit is in the first position. As such, the space 162 decreases in size, as shown in FIGS. 11 and 12, during movement of the unit to the second position such that the lid angle 154 minimizes engagement of the lid 150 with the brake system 44 when in the second position. For example, the space 162 can decrease in size such that the top side 152 of the lid 150 and the component 42, such as the brake system 44, engage or contact each other. As another example, the space 162 can decrease in size such that the top side 152 of the lid 150 and the component 42, such as the brake system 44, remain spaced from each other. Regardless of whether the top side 152 of the lid 150 and the component 42 engage/contact each other when in the second position, the orientation of the power inverter module 72 and the orientation of the lid 150 as discussed above minimize the likelihood of engagement of the power inverter module 72/lid 150 with the component 42. Therefore, the lid 150, and thus the power inverter module 72, can travel under the brake system 44 when the unit moves to the second position which allows the power inverter module 72 to continue to function as the power inverter module 72 travels under the brake system 44.

Referring to FIGS. 2, 3, 11 and 12, the vehicle 20 can further include a panel 164 extending transverse to the longitudinal axis 28, with the panel 164 and the second side 64 of the transmission casing 52 facing each other. Generally, the panel 164 is coupled to the vehicle body 22, with the panel 164 separating the first end 24 of the vehicle 20 from the vehicle compartment 30. Therefore, the unit is disposed between the first end 24 of the vehicle body 22 and the panel 164.

Generally, the brake system 44 is coupled to the panel 164. The brake system 44 can include a brake pedal 166 movably coupled to the panel 164 inside the vehicle compartment 30. The driver of the vehicle 20 engages the brake pedal 166 to slow or stop the vehicle 20 from moving. The angular position of the power inverter module 72 minimizes engagement of the power inverter module 72 with the brake system 44 when the unit is in the second position. More specifically, the lid angle 154 minimizes engagement of the lid 150 with the brake system 44 when the unit is in the second position to minimize engagement of the power inverter module 72 with the brake system 44. Therefore, movement of the brake pedal 166 toward the driver when the unit is in the second position is minimized by minimizing engagement of the lid 150, and thus the power inverter module 72, with the brake system 44.

The brake system 44 can also include a master cylinder device 168 attached to the panel 164 and extending outwardly toward the first end 24 of the vehicle body 22. The master cylinder device 168 is coupled to the brake pedal 166 and cooperates with the brake pedal 166 to slow or stop the vehicle 20 from moving. The angular position of the power inverter module 72 minimizes engagement of the power inverter module 72 with the master cylinder device 168 when the unit is in the second position. More specifically, the lid angle 154 minimizes engagement of the lid 150 with the master cylinder device 168 when the unit is in the second position to minimize engagement of the power inverter module 72 with the master cylinder device 168. Therefore, movement of the brake pedal 166 toward the driver when the unit is in the second position is minimized by minimizing engagement of the lid 150, and thus the power inverter module 72, with the master cylinder device 168.

Continuing with FIGS. 2, 3, 11 and 12, as discussed above, the component 42 can be further defined as the first component 42, and the vehicle 20 can further include the second component 48. Generally, the second component 48 is coupled to the vehicle body 22, with the second component 48 disposed between the first end 24 of the vehicle body 22 and the first side 62 of the transmission casing 52 such that the unit is disposed between the second component 48 and the panel 164 along the longitudinal axis 28. In certain embodiments, the second component 48 is disposed between the first end 24 of the vehicle body 22 and the wall 56 defining the first side 62 of the transmission casing 52. Therefore, the unit is disposed between the second component 48 and the panel 164. Generally, positioning the power inverter module 72 between the walls 56 adjacent to the distal edge 58 of each of the walls 56 minimizes engagement of the power inverter module 72 with the second component 48 when the unit is in the second position. In other words, when the unit is in the second position, the second component 48 can engage the detachable segment 60 of the transmission casing 52; therefore, positioning the power inverter module 72 along the top of the transmission 50 minimizes engagement of the power inverter module 72 with the second component 48.

In certain embodiments, as also discussed above, the first component 42 is the brake system 44 and the second component 48 is the radiator assembly 46. Therefore, the brake system 44 and the radiator assembly 46 can each be coupled to the vehicle body 22. Furthermore, the radiator assembly 46 is disposed between the first end 24 of the vehicle body 22 and the first side 62, with the radiator assembly 46 spaced from the brake system 44. The radiator assembly 46 can include a condenser, a fan, etc.

Under certain conditions, an object can engage the first end 24 of the vehicle body 22 which can cause the radiator assembly 46 to move along the longitudinal axis 28 toward the transmission 50. This movement can cause the radiator assembly 46 to engage the detachable segment 60 of the transmission casing 52 (see FIGS. 11 and 12), which can, in turn, cause the unit to move to the second position such that the space 162 between the top side 152 of the lid 150 and the brake system 44 decreases (compare FIGS. 3 and 12). Positioning the power inverter module 72 along the top of the transmission 50 minimizes the likelihood of the radiator assembly 46 engaging the power inverter module 72 during conditions when the radiator assembly 46 engages the detachable segment 60. In addition, positioning the power inverter module 72 along the top of the transmission 50 minimizes the likelihood of the vehicle body 22 or suspension components engaging the power inverter module 72 under various conditions. Furthermore, the lid angle 154 of the lid 150 allows the lid 150, and thus the power inverter module 72, to travel under the brake system 44 when the unit moves to the second position, thus minimizing movement of the brake pedal 166 inside the vehicle compartment 30. Additionally, the angular position of the power inverter module 72 allows the power inverter module 72 to continue to function as the power inverter module 72 travels under the brake system 44 when the unit moves to the second position. The location of the power inverter module 72 allows orderly de-powering of various vehicle components when the vehicle's control system determines the vehicle 20 should be de-powered under certain conditions.

It is to be appreciated that various components have been removed from FIG. 4 for illustrative purposes only, for example, fasteners for attaching or securing the lid 150 to the transmission casing 52 have been removed, as well as the first cable harness 80 and the wire harness 106 have been removed. It is to also be appreciated that not all of the components have been exploded in FIG. 4 for illustrative purposes only, for example, the second cable harness 94.

While the best modes for carrying out the disclosure have been described in detail, those familiar with the art to which this disclosure relates will recognize various alternative designs and embodiments for practicing the disclosure within the scope of the appended claims.

The invention claimed is:

1. A vehicle comprising:
a vehicle body including a first end and a second end spaced from each other along a longitudinal axis;
a component disposed between the first and second ends of the vehicle body;
a transmission casing disposed between the first and second ends of the vehicle body, with the transmission casing including a base and a plurality of walls extending outwardly away from the base to a distal edge opposing the base;
wherein one of the walls defines a first side facing the first end of the vehicle body and another one of the walls defines a second side facing the second end of the vehicle body;
a power inverter module disposed between the walls adjacent to the distal edge of each of the walls, with the power inverter module coupled to the transmission casing to define a unit;
wherein the unit is disposed in a first position when the unit is stationary relative to the first end of the vehicle body and the unit is disposed in a second position when the unit moves toward the second end of the vehicle body; and
wherein the power inverter module slopes downwardly from the first side toward the second side to define a module angle relative to the longitudinal axis such that the power inverter module defines an angular position, and wherein the angular position of the power inverter module minimizes engagement of the power inverter module with the component when the unit is in the second position.

2. A vehicle as set forth in claim 1 further including a platform attached to the transmission casing between the walls, with the power inverter module supported by the platform in the angular position.

3. A vehicle as set forth in claim 2 wherein the platform includes a first mounting portion and a second mounting portion spaced from each other along the longitudinal axis, with the power inverter module attached to the first and second mounting portions to secure the power inverter module to the platform relative to the walls in the angular position.

4. A vehicle as set forth in claim 3 wherein the first mounting portion includes a plurality of first footings spaced from each other and each extending from the platform to define a first height transverse to the longitudinal axis, and wherein the second mounting portion includes a plurality of second footings spaced from each other and each extending from the platform to define a second height transverse to the longitudinal axis, with the first height less than the second height such that the first and second footings cooperate to orientate the power inverter module in the angular position.

5. A vehicle as set forth in claim 2 wherein the platform includes a step separating a first part of the platform and a second part of the platform, with the first part disposed a first distance from the distal edge of at least one of the walls transverse to the longitudinal axis and the second part disposed a second distance from the distal edge of the same one of the walls measuring the first distance, and with the first distance less than the second distance.

6. A vehicle as set forth in claim 5 wherein the platform includes a first mounting portion attached to the first part of the platform and a second mounting portion attached to the second part of the platform, with the power inverter module attached to the first and second mounting portions to secure the power inverter module to the platform relative to the walls in the angular position.

7. A vehicle as set forth in claim 6 wherein the first mounting portion includes a plurality of first footings spaced from each other and each extending from the first part of the platform to define a first height transverse to the longitudinal axis, and wherein the second mounting portion includes a plurality of second footings spaced from each other and each extending from the second part of the platform to define a second height transverse to the longitudinal axis, with the first height less than the second height such that the first and second parts and the first and second footings cooperate to orientate the power inverter module in the angular position.

8. A vehicle as set forth in claim 1 wherein the module angle is from about 15 to about 30 degrees relative to the longitudinal axis.

9. A vehicle as set forth in claim 1 wherein the module angle is from about 20 to about 25 degrees relative to the longitudinal axis.

10. A vehicle as set forth in claim 1 further including a lid attached to the distal edge of each of the walls to contain the power inverter module in the transmission casing and further defines the unit, with the lid including a top side opposing the base of the transmission casing.

11. A vehicle as set forth in claim 10 wherein the top side of the lid slopes downwardly from the first side toward the second side to define a lid angle relative to the longitudinal axis, with the lid angle and the module angle complementary to each other, and wherein the lid angle minimizes engagement of the lid with the component when the unit is in the second position to minimize engagement of the power inverter module with the component.

12. A vehicle as set forth in claim 11 wherein the top side of the lid includes a shoulder separating a first segment of the top side and a second segment of the top side, with the first segment and the component defining a space therebetween when the unit is in the first position, and wherein the space decreases in size during movement of the unit to the second position such that the lid angle minimizes engagement of the lid with the component when in the second position to minimize engagement of the power inverter module with the component.

13. A vehicle as set forth in claim 12 wherein the component is a brake system, with the first segment and the brake system defining the space therebetween when the unit is in the first position, and the space decreases in size during movement of the unit to the second position such that the lid angle minimizes engagement of the lid with the brake system when in the second position.

14. A vehicle as set forth in claim 11 wherein the lid angle is from about 15 to about 30 degrees relative to the longitudinal axis.

15. A vehicle as set forth in claim 11 wherein the lid angle is from about 20 to about 25 degrees relative to the longitudinal axis.

16. A vehicle as set forth in claim 1 wherein the component is a brake system and further including a panel extending transverse to the longitudinal axis, with the panel and the second side of the transmission casing facing each other, and with the brake system coupled to the panel, and wherein the angular position of the power inverter module minimizes engagement of the power inverter module with the brake system when the unit is in the second position.

17. A vehicle as set forth in claim 16 wherein the brake system includes a master cylinder device attached to the panel and extending outwardly toward the first end of the vehicle body, and wherein the angular position of the power inverter module minimizes engagement of the power inverter module with the master cylinder device when the unit is in the second position.

18. A vehicle as set forth in claim 16 further including a second component disposed between the first end of the vehicle body and the first side of the transmission casing such that the unit is disposed between the second component and the panel along the longitudinal axis, and wherein positioning the power inverter module between the walls adjacent to the distal edge of each of the walls minimizes engagement of the power inverter module with the second component when the unit is in the second position.

19. A vehicle as set forth in claim 18 wherein the second component is a radiator assembly.

20. A vehicle comprising:
a vehicle body including a first end and a second end spaced from each other along a longitudinal axis;
a brake system disposed between the first and second ends of the vehicle body;
a transmission casing disposed between the first and second ends of the vehicle body, with the transmission casing including a base and a plurality of walls extending outwardly away from the base to a distal edge opposing the base;
wherein one of the walls defines a first side facing the first end of the vehicle body and another one of the walls defines a second side facing the second end of the vehicle body;
a radiator assembly disposed between the first end of the vehicle body and the first side, with the radiator assembly spaced from the brake system;
a power inverter module disposed between the walls adjacent to the distal edge of each of the walls, with the power inverter module coupled to the transmission casing to define a unit;
a lid attached to the distal edge of each of the walls to contain the power inverter module in the transmission casing and further define the unit, with the lid including a top side opposing the base of the transmission casing;
wherein the unit is disposed in a first position when the unit is stationary relative to the first end of the vehicle body and the unit is disposed in a second position when the unit moves toward the second end of the vehicle body; and
wherein the power inverter module slopes downwardly from the first side toward the second side to define a module angle relative to the longitudinal axis such that the power inverter module defines an angular position;
wherein the top side of the lid slopes downwardly from the first side toward the second side to define a lid angle relative to the longitudinal axis, with the lid angle and the module angle complementary to each other;
wherein the top side of the lid and the brake system define a space therebetween when the unit is in the first position, and the space decreases in size during movement of the unit to the second position such that the lid angle minimizes engagement of the lid with the brake system when the unit is in the second position to minimize engagement of the power inverter module with the brake system.

* * * * *